United States Patent [19]
Simpson

[11] Patent Number: 5,688,018
[45] Date of Patent: Nov. 18, 1997

[54] PROTECTIVE COVER FOR GOLF BAGS ON A GOLF CAR

[76] Inventor: John Albert Simpson, 2104 Mountain View Dr., Birmingham, Ala. 35216

[21] Appl. No.: 594,013

[22] Filed: Jan. 30, 1996

[51] Int. Cl.[6] .................................................. B60J 9/00
[52] U.S. Cl. .................. 296/138; 296/77.1; 296/141; 150/159
[58] Field of Search ............................. 296/77.1, 78.1, 296/136, 138, 140, 141, 144; 150/159, 166

[56] References Cited

U.S. PATENT DOCUMENTS

| | | |
|---|---|---|
| 3,709,553 | 1/1973 | Churchill et al. .............. 296/77.1 X |
| 4,013,315 | 3/1977 | West ................................ 296/138 X |
| 4,773,694 | 9/1988 | Gerber ............................. 296/77.1 |
| 5,259,656 | 11/1993 | Carroll ............................ 296/77.1 |
| 5,388,881 | 2/1995 | Spencer et al. ................. 296/77.1 |

*Primary Examiner*—Andrew C. Pike
*Attorney, Agent, or Firm*—Kilpatrick Stockton LLP

[57] ABSTRACT

A protective cover for golf bags on a golf car is easily installed and removed, consisting of a clear vinyl sheet having a taper toward the top edge and metal snaps or corner straps disposed thereon for attaching the cover to a golf car roof or a horizontal support bar, and an elastic cord having a hook at each end for securing the bottom portion of the cover to the golf car.

27 Claims, 3 Drawing Sheets

PROTECTIVE COVER FOR GOLF BAGS ON A GOLF CAR

BACKGROUND OF THE INVENTION

1. Field of the Invention

The present invention relates to protective covers for golf bags on golf cars.

2. Description of the Prior Art

Golf is a recreational activity enjoyed by millions of persons worldwide. As golf is necessarily an outdoor recreation, it is unavoidable that golfers must expose themselves and their equipment to the elements. Most commonly, this means exposure to rain and sun, but occasionally to snow, sleet and hail. Due to the high cost of golf equipment, particularly golf clubs and golf bags, it is desirable to protect such equipment from the elements when the equipment is in use.

A substantial number of golfers employ golf cars (also known as golf carts) as a means of transportation around the golf course. Typically, golf cars are four wheeled vehicles having an electric- or gasoline powered motor, a two-person bench seat in the front, and a bay in the rear for storing golf bags in an upright position. The golf bags are held in place by devices resembling automobile seat belts, and the clubs are accessible from the rear of the car. In order to protect the golfers and their equipment from the elements, most golf cars have a roof or cover supported by four vertical support posts in the corners of the roof. However, most golf cars are open on the sides and to the rear, providing little protection from heavy or wind-driven precipitation.

Enclosed golf cars have been made by fully enclosing the sides and back of the car by hanging clear plastic sheets from the sides of the roof. However, such solutions are often heavy, cumbersome, and difficult to install, remove, and store. Also, the protective covers known in the art hinder access to the golf clubs during play.

Moreover, it frequently happens that golf rounds are temporarily interrupted by rain showers. This is due to the length of time it takes to play a typical round of golf and due to the frequency of brief rain showers during the prime golfing seasons. Particularly in certain regions of the country, such rain showers can form and disperse very quickly. Once the rain shower has ended, the golfers may resume their round.

Accordingly, there is a need in the art for a protective cover for use on the rear of a golf car which protects golf clubs from the elements, but is easy to install, remove, transport and store. There is also a need in the art for a protective cover for golf bags on golf cars which does not hinder access to the golf clubs, and which may be easily and quickly engaged and disengaged in the event of a sudden rain shower.

SUMMARY OF THE INVENTION

The present invention provides a sheet of clear plastic having dimensions approximately 50" high by 44" high. The size of the plastic sheet may obviously vary depending on the size of the golf car to which it is to be attached. However, as most golf cars are approximately the same size, 50"×44" is the preferred dimension. Vinyl plastic is preferred, as it is extremely flexible and durable. Obviously, the plastic sheet must be clear to provide a full field of view for the driver of the golf car. The protective cover preferably is generally rectangular in shape, with a slight taper toward the top. The taper permits the cover to be wider along the bottom edge than the golf car is, which permits the cover to fit around bulky golf bags at its bottom portion. The top, or tapered end, of the protective cover is preferably approximately 33" wide, while the bottom, untapered end is approximately 44" wide. The top edge of the protective cover is preferably reinforced with nylon.

An elastic cord having hooks at each end is inserted in a binding which runs across the bottom portion of the cover. The binding holds the elastic cord on the protective cover, while allowing some lateral displacement between the cover and the strap. Preferably, the binding consists of a strip of plastic having a width sufficient to hold the elastic cord in place and a length approximately equal to the width of the bottom edge of the protective cover. The plastic strip is sewn or sealed across the bottom portion of the protective cover along the top and bottom edges of the plastic strip, leaving the side edges of the strip unsealed. The cord is then inserted between the strip and the cover and drawn through the space between the strip and the cover. The binding is preferably located several inches above the lower edge of the cover to allow access to the golf bag pockets even while the cover is installed.

The elastic cord preferably comprises a "bungee"-type cord, but may alternatively be constructed of elasticized rubber or any other suitable material having similar properties. Each hook will be connected to a rear corner post on the golf car to hold the protective cover in place. Once installed, the elastic cord will firmly hold the bottom portion of the cover against the golf bags.

The cover has three fasteners disposed along its top edge, one at each corner and one in the center, and three fastener receiving means disposed adjacent to the first fasteners. The fasteners are preferably metal snap caps, and the fastener receiving means are preferably metal snaps, and the remainder of this description will refer to such fasteners as such. However, it is readily apparent that other fastener and fastener receiver means can be substituted for snaps and snap caps without departing from the spirit or scope of the present invention.

Three snaps are installed on a horizontal support member disposed between the two rear vertical roof supports to receive the three snap caps. In an alternative embodiment, a bar having three metal snaps to receive the snap caps is detachably or permanently mounted to the golf car at the top of the two rear support posts. It should be understood that the design of the bar may vary depending on the design of the rear support posts without departing from the spirit or scope of the present invention. In one embodiment, the bar may take the form of an elongated angle bracket. Thus, all references herein to a "bar" should be understood to include an elongated angle bracket and any other such minor variation.

The bar is preferably composed of a lightweight non-corrosive metal such as aluminum, but may obviously be constructed of any suitable material having similar properties. The bar may be attached to the rear support posts in any suitable manner such as with bolts or by welding. The bar may be attached permanently or in a removable fashion, depending on the requirements of a particular application.

In another alternative embodiment, the protective cover may be provided with nylon straps at its top corners. The protective cover may be secured to the golf car by attaching the corner straps to the car's rear support posts. The corner straps are attached to the rear support posts at the connection point of the support posts to the car's roof.

Two or three plastic straps, preferably composed of nylon or an equivalent material, are spaced equally across the top of the protective cover. These straps may be engaged to hold the cover in a rolled-up position at the rear edge of the roof when the protective cover is not needed.

The protective cover of the present invention may be installed before or after golf bags have been loaded onto the car. The cover is installed by unrolling or unfolding it and snapping the three snap caps to the three snaps on the metal bar. If the golf bags are already in place in the rear bay of the car, the bottom of the protective cover is draped down over the golf bags. The elastic cord is then engaged by attaching each hook to one of the rear vertical roof supports on the car.

If the golf bags are not already in place, the protective cover may be simply lifted for access to the rear bay, or it may be rolled up and secured by means of the nylon straps to provide a clear access path to the rear bay.

The protective cover is removable by disengaging the three snap caps from the snaps on the metal bar or by disengaging the corner straps from the rear support posts. Alternatively, the protective cover can be rolled up and secured by means of the two or three nylon straps, which are then snapped in place to the snaps disposed in the top edge of the protective cover.

It is, therefore, the general object of the present invention to provide an improved protective cover for use on the rear of a golf car which protects golf clubs from the elements, but is easy to install, remove, transport and store.

It is a further object of the present invention to provide a protective cover for golf bags on golf cars which does not hinder access to the golf clubs.

The foregoing and other features, aspects, and advantages of the present invention will become better understood with regard to the following description, appended claims, and accompanying drawings.

DETAILED DESCRIPTION OF THE PREFERRED EMBODIMENT

Figure 1:
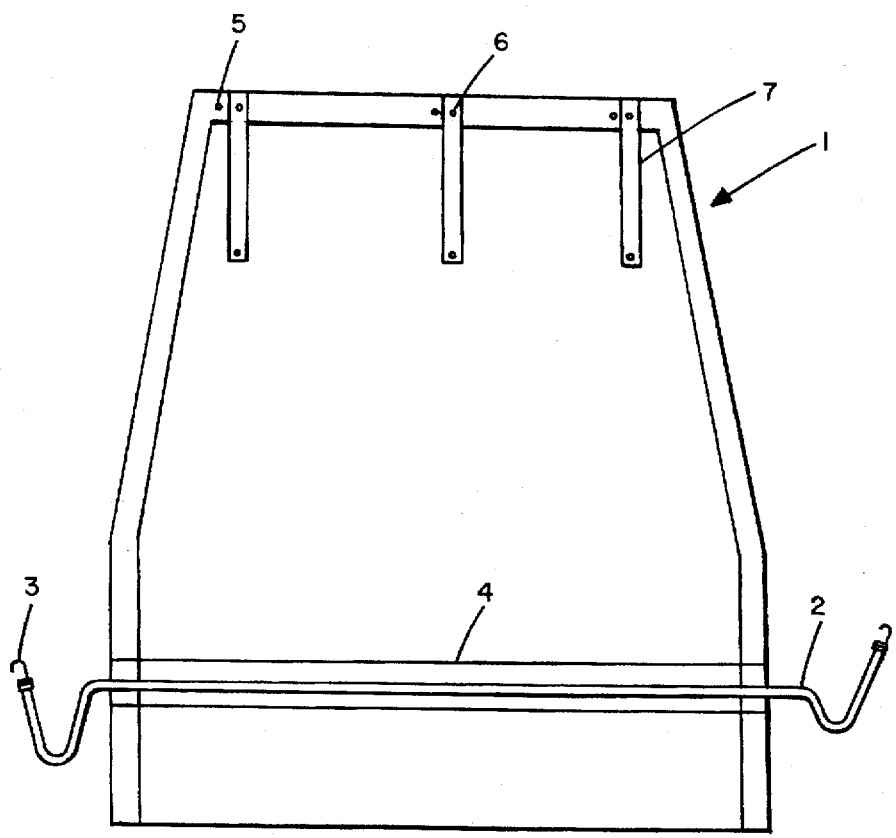
FIG. 1 is a front view of the protective cover.
Figure 2:
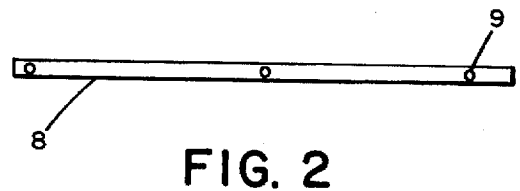
FIG. 2 is a front view of the horizontal bar or angle bracket for mounting the protective cover.
Figure 3:
FIG. 3 shows a side view of the horizontal bar or angle bracket shown in FIG. 2.

FIG. 1 shows the protective cover 1 of the present invention. The protective cover 1 is composed of clear vinyl plastic. As shown, the protective cover 1 is generally rectangular in shape, with a slight taper toward the top. The top edge of the protective cover is preferably reinforced with nylon.

An elastic bungee-type cord 2 having hooks 3 at each end is inserted in a binding 4 which runs across the bottom portion of the cover. The binding 4 holds the elastic cord 2 on the protective cover, while allowing some lateral displacement between the cover and the strap. The binding 4 consists of a strip of vinyl plastic having a width of approximately three inches and a length approximately equal to the width of the bottom edge of the protective cover 1. The binding 4 is sewn across the bottom portion of the protective cover 1 along the top and bottom edges of the binding 4, leaving the side edges of the binding 4 unsealed. The cord 2 is disposed between the binding 4 and the cover 1 and drawn through the space defined therebetween. The binding 4 is disposed several inches above the bottom edge of the cover 1 to permit easy access to pockets on the outside of the golf bags even while the cover 1 is installed.

The cover 1 has three metal snap caps 5 disposed along its top edge, one at each corner and one in the center, and two or three metal snaps 6 disposed adjacent to the snap caps.

Figure 5:
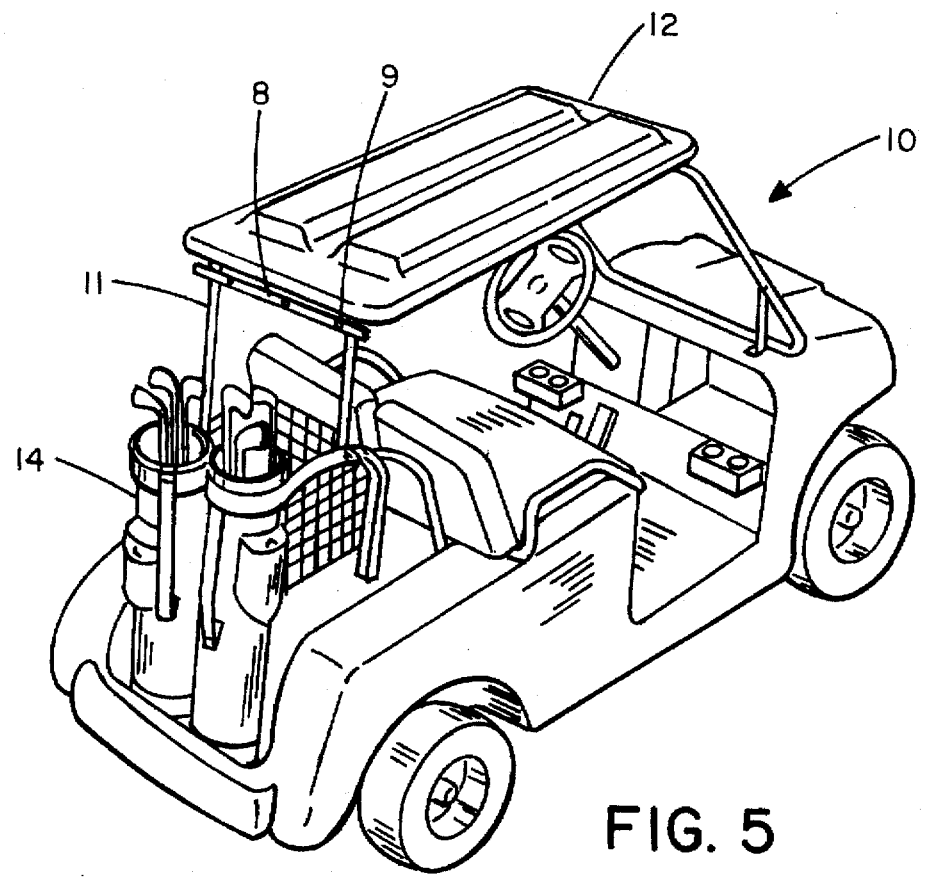
FIG. 5 is a perspective view of the horizontal bar or angle bracket installed on a golf car.

Two or three nylon straps 7 are attached at the top corners of the protective cover 1. The straps 7 may be engaged to hold the cover 1 in a rolled-up position at the rear edge of the roof when the protective cover is not needed, as shown in FIG. 5.

Three snaps are installed on a horizontal support member (not shown) disposed between the two rear vertical roof supports to receive the three snap caps 5.

In an alternative embodiment, a bar 8 as shown in FIGS. 2–5, having three metal snaps 9 to receive the snap caps 5, is detachably or permanently mounted to the golf car at the top of the two rear support posts 11. In one embodiment, the bar may have the shape of an elongated angle bracket having an L-shaped cross section.

The cover 1 is installed by snapping the metal snap caps 5 to the snaps 9 on the bar 8. The hooks 3 are then each connected to the corresponding rear corner post 11.

Figure 4:
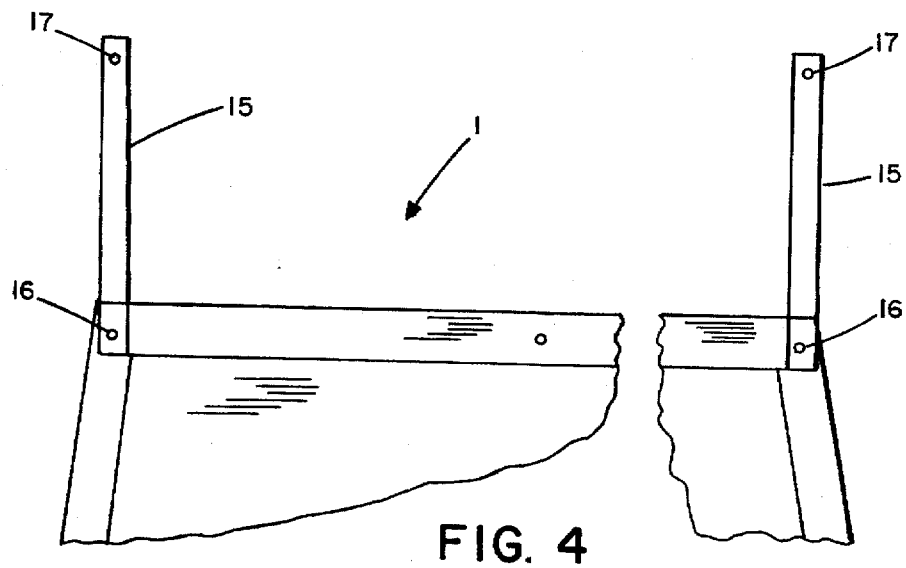
FIG. 4 shows the attachment of the corner straps to the protective cover.
Figure 8:
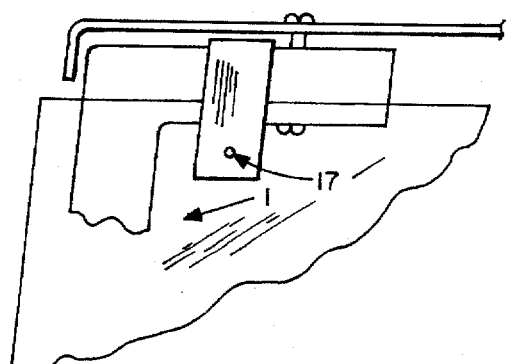
FIG. 8 is an enlarged rear view of the strap of the alternative embodiment of the protective cover attached to the rear of a golf car.
Figure 9:
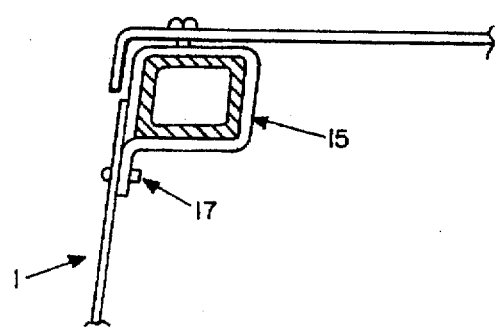
FIG. 9 is an enlarged side view of the strap as shown in FIG. 8 with the bar being shown in cross-section.

FIG. 4 shows the attachment of the corner straps 15 to the cover 1. With corner straps provided, the cover may be mounted to the golf car by attaching the corner straps 15 to the top of the two rear support posts 11 of the golf car (see FIGS. 8–9). The corner straps are provided with snaps 16 and snap caps 17.

Figure 7:
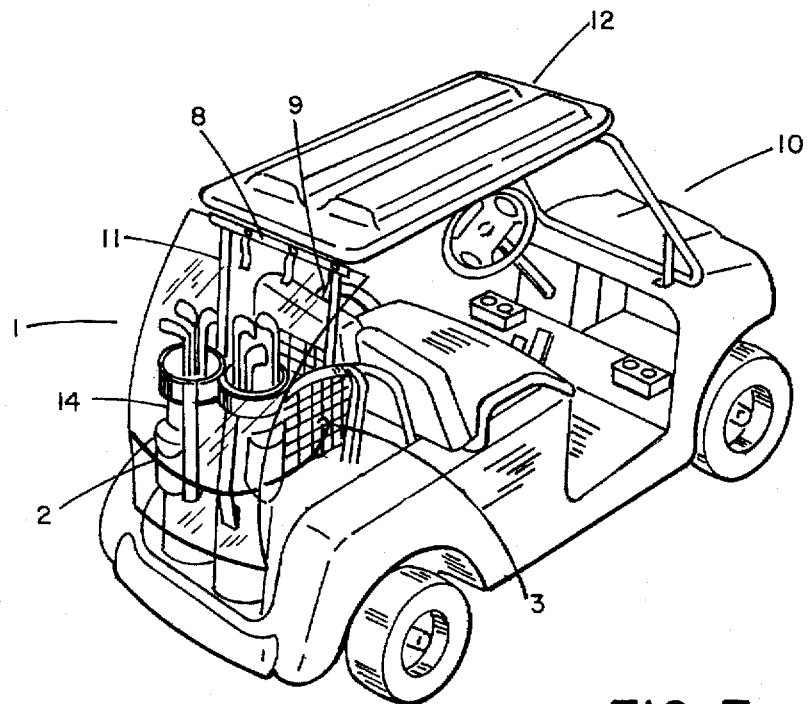
FIG. 7 is a perspective view of the protective cover in use with the hooks of the cover connected to the rear of the golf car to hold the cover in place.

FIG. 5 shows the bar 8 of the present invention installed on a golf car 10. The protective cover 1 is then snapped onto the bar 8. As shown in FIG. 7, each hook 3 is connected to a rear corner post 11 on the golf car 10 to hold the protective cover 1 in place. Once installed, the elastic cord 2 firmly holds the bottom portion of the cover against the golf bags 14.

The protective cover 1 is removable by disengaging the three snap caps 5 from the snaps 9 on the horizontal bar 8. Alternatively, the protective cover 1 can be rolled up and secured by means of the two or three nylon straps 7, which are then snapped in place to the snaps 6 disposed in the top edge of the protective cover.

Figure 6:
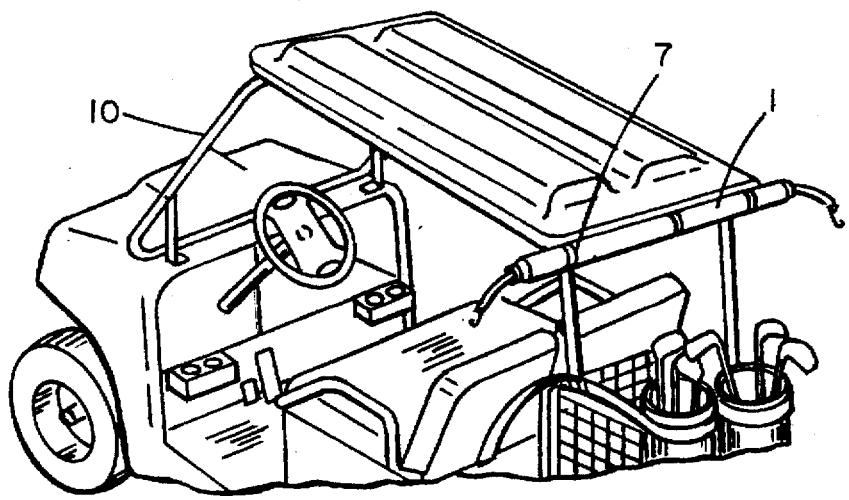
FIG. 6 is a perspective view of the protective cover in the rolled-up position.

FIG. 6 shows the protective cover 1 in the rolled-up position on the golf car 10. The protective cover is secured in the rolled-up position by means of straps 7.

What is claimed is:

1. A protective cover for protecting golf bags and golf clubs mounted on a rear of a golf car from precipitation, said protective cover comprising:

a sheet having a top edge and a bottom edge;

means, disposed on the top edge of said sheet, for fastening the top edge of said sheet to the rear of the golf car; and means, disposed on said sheet near the bottom edge of said sheet, for securing said sheet against the golf bags and for attaching said sheet to the rear of the golf car, said means disposed on said sheet near the bottom edge comprising: an elastic cord having two ends and a hook disposed on each said end, said elastic cord being horizontally disposed near the bottom edge of the sheet, and means for attaching said elastic cord to said sheet, said attachment means allowing for lateral displacement between the sheet and the cord.

2. The protective cover of claim 1, wherein said sheet is composed of clear material.

3. The protective cover of claim 1, wherein said sheet is composed of vinyl plastic.

4. The protective cover of claim 1, wherein said means for fastening the top edge of said sheet to the golf car comprises a plurality of fasteners.

5. The protective cover of claim 4, wherein said plurality of fasteners for attaching the top edge of said sheet to the rear of the golf car includes three snap caps spaced approximately equally across the top edge of said sheet.

6. The protective cover of claim 1, wherein said means for attaching said elastic cord to said sheet comprises a plastic strip affixed laterally across said sheet.

7. The protective cover of claim 6, wherein said plastic strip has a top edge and a bottom edge, and said plastic strip is affixed to said sheet along the top edge and the bottom edge of said plastic strip.

8. The protective cover according to claim 1, wherein said means for attaching said elastic cord to said sheet is disposed at the bottom edge of said sheet.

9. The protective cover of claim 1, wherein said sheet is tapered at the top edge thereof, so that the top edge of said sheet is narrower than the bottom edge of said sheet.

10. The protective cover of claim 1, further comprising means for holding said sheet in a rolled-up position.

11. The protective cover of claim 10, wherein said holding means comprises:

a plurality of nylon straps each of said straps having at least two ends, said straps being affixed to the top edge of said sheet at one of said two ends thereof;

a plurality of fasteners disposed at another of said ends of said straps; and a plurality of fastener receivers disposed along the top edge of said sheet.

12. The protective cover of claim 1, wherein said means for fastening the top edge of said sheet to the golf car comprises a plurality of straps attached to the top edge of said sheet.

13. The protective cover of claim 12, wherein said straps are composed of nylon material.

14. The protective cover of claim 12, wherein said sheet has at least two upper corners, and one of each of said straps is attached at each of said upper corners.

15. A protective cover for protecting golf bags and golf clubs mounted on a golf car from precipitation, said golf car being of a type having a roof with a rear edge and having at least two vertical support posts disposed near the rear edge of the roof, said protective cover comprising:

a sheet having a top edge and a bottom edge;

means, disposed on the top edge of said sheet, for fastening the top edge of said sheet to the golf car;

means, disposed on said sheet near the bottom edge of said sheet, for securing said sheet against the golf bags and for attaching said sheet to the golf car; and means, attachable to the vertical support posts at the rear edge of the golf car roof, for receiving said fastening means.

16. The protective cover of claim 15, wherein said receiving means comprises a bar having fastening means disposed thereon approximately in coordination with and for receiving said fastening means disposed on the top edge of said sheet.

17. The protective cover of claim 16, wherein said fastening means disposed on said bar comprises a plurality of snaps.

18. The protective cover of claim 16, wherein said bar is attachable to the vertical support posts at the rear edge of the golf car roof.

19. The protective cover of claim 15, wherein said receiving means comprises a bar horizontally disposed for mounting on the vertical support posts of the golf car, said bar including a plurality of fasteners corresponding with said fastening means disposed on the top edge of said sheet for fastening said sheet to said bar and securing the protective cover to the golf car.

20. The protective cover of claim 19, wherein said bar is a lightweight metal.

21. A protective cover for protecting golf bags and golf clubs mounted on a rear of a golf car from precipitation, said protective cover comprising:

a sheet having a top edge and a bottom edge;

means, disposed on the top edge of said sheet, for fastening the top edge of said sheet to the rear of the golf car;

means, disposed on said sheet near the bottom edge of said sheet, for securing said sheet against the golf bags and for attaching said sheet to the rear of the golf car; and means for holding said sheet in a rolled-up position comprising: a plurality of nylon straps each of said straps having at least two ends, said straps being affixed to the top edge of said sheet at one of said ends; a plurality of fasteners disposed at another of said ends of said straps; and a plurality of fastener receivers disposed along the top edge of said sheet.

22. The protective cover of claim 21, wherein said sheet is composed of transparent material.

23. The protective cover of claim 21, wherein said means for fastening the top edge of said sheet to the golf car comprises a plurality of fasteners.

24. The protective cover of claim 21, wherein said means for securing said sheet against the golf bags and for attaching said sheet to the golf car comprises:

an elastic cord having two ends and a hook disposed on each of said two ends thereof, said elastic cord being horizontally disposed near the bottom edge of the sheet; and means for attaching said elastic cord to said sheet, said attachment means allowing for lateral displacement between the sheet and the cord.

25. The protective cover of claim 24, wherein said means for attaching said elastic cord to said sheet comprises a plastic strip affixed laterally across said sheet.

26. The protective cover of claim 25, wherein said plastic strip has a top edge and a bottom edge, and said plastic strip is secured to said sheet along the top edge and the bottom edge of said plastic strip.

27. The protective cover according to claim 24, wherein said means for attaching said elastic cord to said sheet is disposed at the bottom edge of said sheet.

* * * * *